(12) United States Patent
Welker et al.

(10) Patent No.: US 6,609,302 B2
(45) Date of Patent: Aug. 26, 2003

(54) BOLT CUTTING TOOL

(76) Inventors: David Welker, 1105 Boars Head Ct., Lake St. Louis, MO (US) 63376; Orville Welker, 1852 Queen Anne Ct., Wentzville, MO (US) 63385; Angelo Torrillo, 3926 Alexander, St. Louis, MO (US) 63116

( * ) Notice: Subject to any disclaimer, the term of this patent is extended or adjusted under 35 U.S.C. 154(b) by 42 days.

(21) Appl. No.: 10/061,932

(22) Filed: Jan. 31, 2002

(65) Prior Publication Data

US 2003/0140499 A1 Jul. 31, 2003

(51) Int. Cl.[7] ............................................... B23D 21/06
(52) U.S. Cl. .............................. 30/92; 30/250; 30/278
(58) Field of Search ............................ 30/92, 194, 226, 30/231, 250, 278

(56) References Cited

U.S. PATENT DOCUMENTS

| | | | |
|---|---|---|---|
| 1,500,024 A | | 7/1924 | Lutz |
| 2,263,229 A | | 11/1941 | York |
| 2,559,866 A | * | 7/1951 | Gambrill ..................... 30/278 |
| 2,560,318 A | * | 7/1951 | Wenger ....................... 30/240 |
| 3,716,879 A | * | 2/1973 | Boyajian ..................... 30/194 |
| 3,949,473 A | * | 4/1976 | Blanc ......................... 30/191 |
| 4,058,893 A | * | 11/1977 | Boyajian ..................... 30/250 |
| 4,174,646 A | | 11/1979 | Kotler |
| 4,194,286 A | * | 3/1980 | Kearns ........................ 30/226 |
| 4,249,308 A | * | 2/1981 | Boyajian ..................... 30/231 |
| 4,450,626 A | * | 5/1984 | Worthington ................ 30/226 |
| 5,237,751 A | * | 8/1993 | Moore et al. ................ 30/200 |
| 6,185,825 B1 | * | 2/2001 | Olson ......................... 30/250 |
| 2001/0002565 A1 | | 6/2001 | Kachergius |

* cited by examiner

*Primary Examiner*—Hwei-Siu Payer
(74) *Attorney, Agent, or Firm*—Thompson Coburn, LLP

(57) ABSTRACT

A bolt cutting tool comprises a bolt engaging portion and a cutting blade. The bolt engaging portion has at least one bolt-receiving bore, which is adapted for receiving a portion of a bolt to be cut. The cutting blade is rotatably connected to the tool generally adjacent the bolt engaging portion. The cutting blade has a cutting surface with an arcuate peripheral cutting edge. The cutting blade is adapted for rotation relative to the bolt-receiving bore from a pre-cut starting position toward a post-cut finishing position. The blade is adapted to rotate in a manner so that the arcuate peripheral cutting edge of the blade cuts the bolt as the cutting blade is rotated toward the post-cut finishing position. The blade is configured so that an angle of incidence between the cutting surface of the blade and a center axis of the bolt-receiving bore is less than 15 degrees when the blade is in its pre-cut starting position.

29 Claims, 5 Drawing Sheets

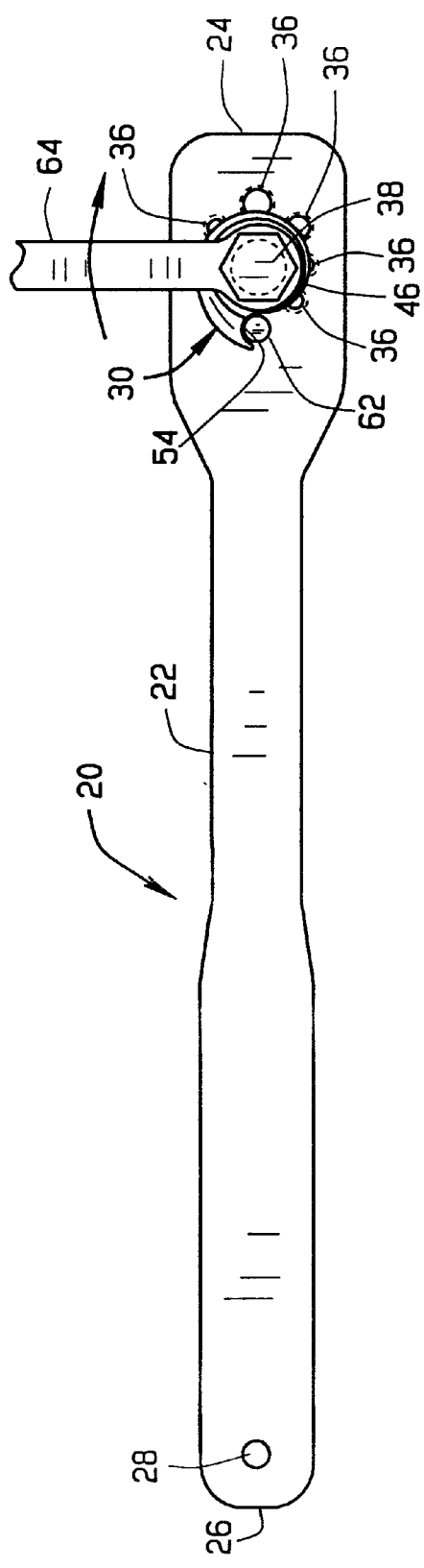
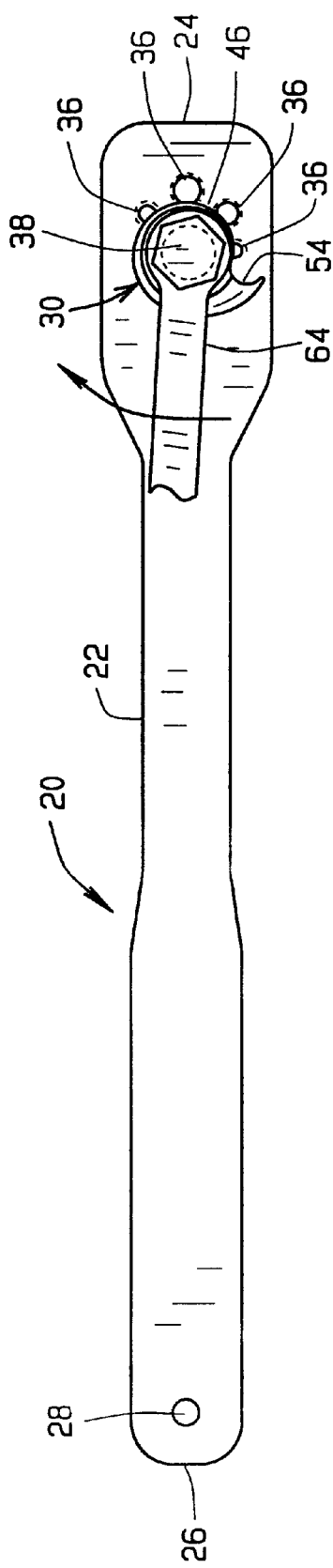
FIG. 10
FIG. 11

BOLT CUTTING TOOL

BACKGROUND OF THE INVENTION

The present invention pertains to an apparatus for sizing a bolt to a desired length. In particular, the apparatus of the present invention shears a bolt to a desired custom length, producing lead threads on the end of the bolt that are ready for use. Although bolts are available in a variety of standard pre-cut lengths (e.g., ½", ¾", 1", 1½") and such standard lengths are usually suitable for most application, the apparatus of the present invention allows sizing of a bolt to Any desired custom length. The apparatus of the present invention also allows use of the bolt immediately after sizing, without the need for any secondary finishing process.

It is generally known to use grinding wheels and other similar cutting tools to cut or otherwise size a bolt or other mechanical fastener to a desired length. However, such methods are not ideal solutions in all cases. Often times, heat generated in a grinding process may tend to anneal a hardened bolt, thereby degrading its strength. Although coolants may be used to control the amount of generated heat, such coolants must be contained. The use of fluid coolants also tends to be messy and not worth the trouble for small jobs. Also, both the bolt and the cut-off end may be dangerously hot from the grinding or other cutting operation, such that the bolt may not be safely usable for some period of time. Such processes may also cause undesirable discoloration of the bolt or potentially dangerous smoke and sparks.

There are other inherent problems in using conventional cutting tools for sizing a bolt to length. Cutting operations can be relatively time consuming. For example, in grinding, the processing time can be influenced by several factors including the type and size of the grinding wheel, the speed of rotation of the grinding wheel, the speed of advancement of the grinding wheel through the cut, and the material of the bolt. Also, there is usually a fair amount of set-up time involved in preparing a cutting tool for a sizing operation. For instance, in the case of a conventional rotary cut-off tool, a suitable grinding wheel must be mounted and the bolt must be properly secured relative to the wheel to allow its proper sizing. In many cases, there is also a fair amount of skill involved in cutting a bolt to ensure that its end is square that its lead threads are not damaged. Additionally, in some cutting operations, burrs may be formed on the end of the bolt, which must be removed through a secondary finishing operation before use.

As an alternative to using a grinding wheel, smaller diameter bolts may be sheared to a desired length with other conventional cutting tools. However, in shearing, care must be used to ensure the lead threads at the bolt end are not damaged. If lead threads are damaged, the user must either discard the damaged bolt entirely or use a special die to re-cut the threads, which takes some measure of skill. Also, in shearing, care must be used to ensure the cut is as clean as possible without producing burrs on the end of the bolt, which may interfere with the bolt's engagement in a tapped hole or nut. Typically, bolts are made from hardened steel material, and any burrs formed during a sizing process can be difficult and time consuming to remove in secondary finishing operations, such as filing, grinding or sanding. The prior art does include hand tools intended for use in shearing bolts. However, in many cases, such hand tools are difficult to use, because such bolt-shearing operations, by their very nature, require a fair amount of force and proper securement of the bolt to achieve a clean cut without causing deformation of the bolt or damage to the lead threads.

Thus, there is a need for a hand held bolt cutting tool that can be used to shear a bolt to a desired custom length, producing lead threads on the end of the bolt that are ready for use, without the need for any secondary finishing process.

SUMMARY OF THE INVENTION

It is therefore an object of the present invention to provide a device for quickly and easily producing a ready to use bolt at a desired custom length without causing deformation of the bolt or damage to its lead threads. The apparatus of the present invention avoids many of the problems found in conventional grinding, sawing and cutting operations and provides a means for cutting commonly sized bolts for most any type of job.

In general, a bolt cutting tool of the present invention comprises a bolt engaging portion and a cutting blade. The bolt engaging portion has at least one bolt-receiving bore, which is adapted for receiving a portion of a bolt to be cut. The cutting blade is rotatably connected to the tool generally adjacent the bolt engaging portion. The cutting blade has a cutting surface with an arcuate peripheral cutting edge. The cutting blade is adapted for rotation relative to the bolt-receiving bore from a pre-cut starting position toward a post-cut finishing position. The blade is adapted to rotate in a manner so that the arcuate peripheral cutting edge of the blade cuts the bolt as the cutting blade is rotated toward the post-cut finishing position. The blade is configured so that an angle of incidence between the cutting surface of the blade and a center axis of the bolt-receiving bore is less than 15 degrees when the blade is in its pre-cut starting position.

In another aspect of the invention, the arcuate peripheral cutting edge of the cutting blade has a cut initiating portion and a cut finishing portion. The cut initiating portion of the arcuate peripheral cutting edge is adapted for initial engagement with a bolt received in the bolt-receiving bore when the cutting blade is in its pre-cut starting position. The cut finishing portion of the arcuate peripheral cutting edge is adapted for engagement with the bolt when the cutting blade is rotated toward its post-cut finishing position. The arcuate peripheral cutting edge has a radius of curvature that increases as the cutting edge extends from its cut initiating portion toward its cut finishing portion. The radius of curvature of at least a portion of the arcuate peripheral cutting edge increases at a rate that is greater than a constant rate as the cutting edge extends toward its cut finishing portion.

In still another aspect of the invention, a bolt cutting tool comprises a bolt engaging portion and a cutting blade rotatably connected to the tool generally adjacent the bolt engaging portion. The bolt engaging portion has at least one bolt-receiving bore with an internally threaded portion. The internally threaded portion is adapted for threaded engagement with an externally threaded bolt to be cut. The internally threaded portion of the bore defines a major inside diameter of the bore and a minor inside diameter of the bore. The major inside diameter is larger than the minor inside diameter. The cutting blade has a cutting surface with an arcuate peripheral cutting edge. The blade is adapted for rotation relative to the bolt-receiving bore from a pre-cut starting position toward a post-cut finishing position. The blade is adapted for rotation in a manner so that the arcuate peripheral cutting edge of the blade cuts the bolt as the cutting blade is rotated toward, the post-cut finishing position. The arcuate peripheral cutting edge lies within a plane that is generally perpendicular to an axis of rotation of the cutting blade. An end portion of the bore adjacent to the plane is counterbored to a diameter larger than the minor inside diameter.

While the principal advantages and features of the present invention have been described above, a more complete and thorough understanding and appreciation of the invention may be attained by referring to the drawings and detailed description of the preferred embodiments, which follow.

BRIEF DESCRIPTION OF THE DRAWINGS

FIG. 10 is a front elevational view of the bolt cutting tool of FIG. 1 in use with a bolt held in one of the tapped holes of the bolt holding end of the tool, with a wrench in engagement with the cutting blade for turning the blade, and with the cutting blade in a pre-cut starting position;

FIG. 11 is a front elevational view of the bolt cutting tool similar to FIG. 10, but with the cutting blade rotated toward a post-cut finishing position;

Figure 1:
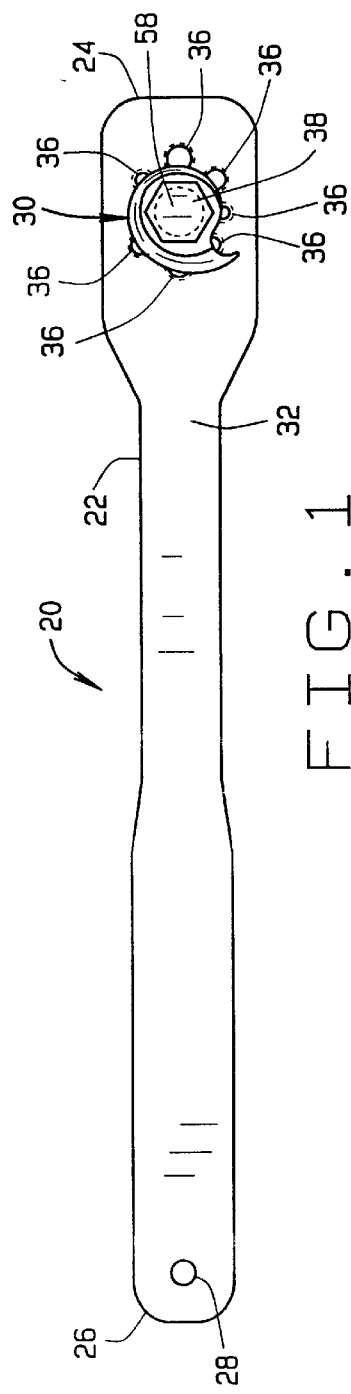
FIG. 1 is a front elevational view of a bolt cutting tool of the present invention.

Reference characters used in these Figures correspond to reference characters used throughout the detailed description of the preferred embodiments, which follows.

DETAILED DESCRIPTION OF THE INVENTION

Figure 2:
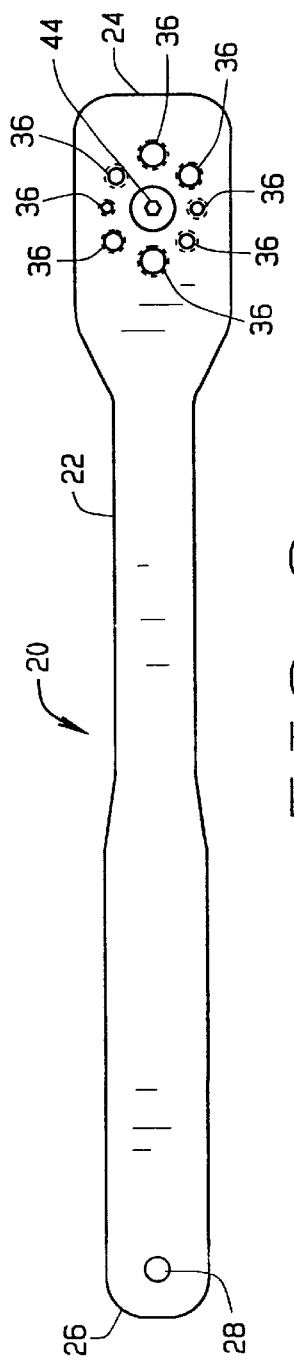
FIG. 2 is a rear elevational view of the bolt cutting tool of FIG. 1.
Figure 3:
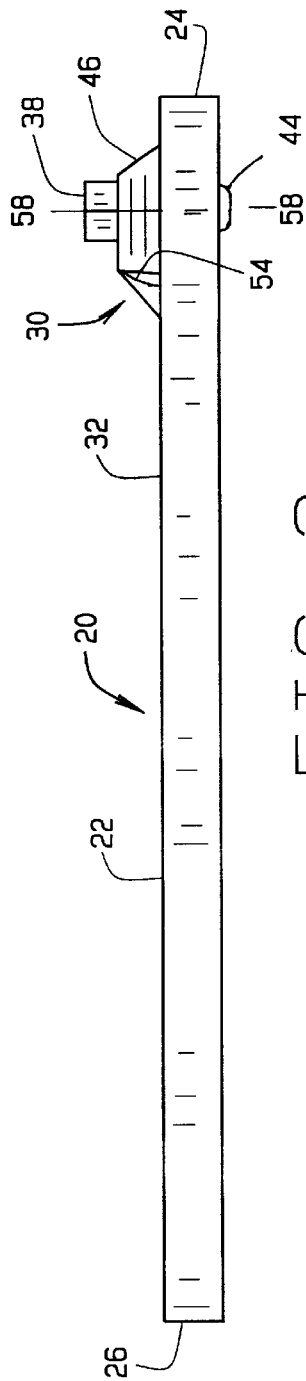
FIG. 3 is a side elevational view of the bolt cutting tool of FIG. 1.

FIGS. 1–3 show a bolt cutting tool 20 of the present invention comprising a generally flat elongated tool shank 22 with a bolt holding end 24 and opposite handle 26. The tool shank 22 is preferably made from a tool steel material that is hardenable and wear and impact resistant. Such tool steel materials may include AISI 4140 hardened to 55 Rockwell C. Preferably, the tool shank 22 is of sufficient length to enable the user to generate the necessary amount of leverage and torque to enable shearing of a bolt. The handle 26 may be provided with a hole 28 on its end to allow a user to hang the bolt cutting tool 20 on a hook for storage or from a tool belt. The bolt holding end 24 is provided with a cam shaped cutter 30 for cutting the bolt to a desired custom length. As will be described below in greater detail, the cam shaped cutter 30 is rotatably attached to the tool shank 22 and extends outward from a cutting side 32 of the tool shank.

Figure 4:
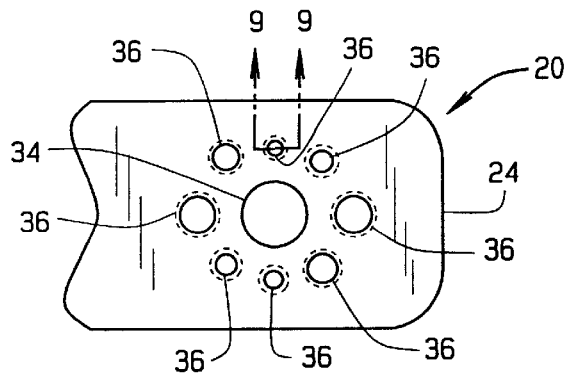
FIG. 4 is a fragmented front elevational view of the bolt holding end of the tool of FIG. 1, with the cutting blade removed to show detail.

With reference to FIG. 4, the bolt holding end 24 is provided with a center cutter hole 34 for rotatably attaching the cam shaped shear cutter 30 to the tool shank, and a plurality of bolt receiving bores 36 are intermittently spaced about the center cutter hole for accommodating the bolt to be sized. Each of the bolt receiving bores 36 is preferably tapped for a different diameter size and thread style. For example, the bolt receiving bores may be tapped for #10-24 and #10-32, ¼"-20 and ¼"-28, $\frac{5}{16}$"-18 and $\frac{5}{16}$"-24, and $\frac{3}{8}$"-16 and $\frac{3}{8}$"-24. The bolt receiving bores 36 may also be tapped for standard metric sizes. The bolt receiving bores 36 are preferably arranged about the center cutter hole 34 in a manner to accommodate their number and size without degrading the strength of the tool shank. Preferably, the bolt receiving bores are spaced from the center cutter hole in a manner whereby the cutter acts upon the bolt as the cutter 30 rotates through at least 270°.

Figure 5:
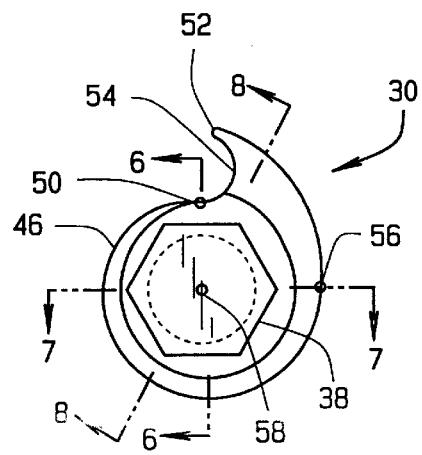
FIG. 5 is an enlarged plan view of the cutting blade.
Figure 6:
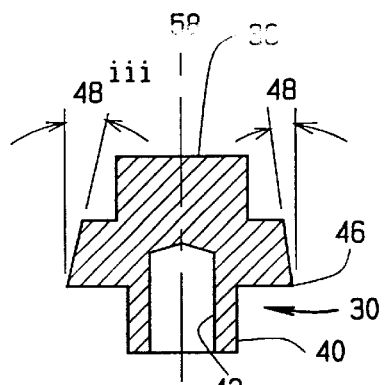
FIG. 6 is an enlarged side cross-sectional view of the cutting blade taken along the plane of line 6—6 in FIG. 5.
Figure 7:
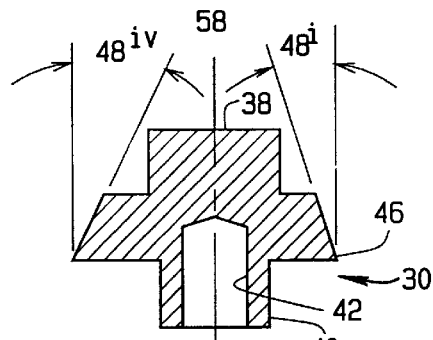
FIG. 7 is an enlarged side cross-sectional view of the cutting blade taken along the plane of line 7—7 in FIG. 5.
Figure 8:
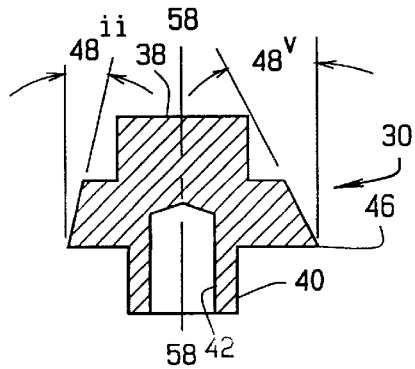
FIG. 8 is an enlarged side cross-sectional view of the cutting blade taken along the plane of line 8—8 in FIG. 5.

As shown in FIGS. 5–8, the cam shaped cutter 30 has a hexagonally shaped driver 38 that extends outward from the cutting side 32 of the tool shank that allows the cam shaped cutter to be rotated by using a standard wrench. Opposite the driver 38, the cam shaped cutter 30 is formed with a bushing 40 that is received in the cutter hole 34 on the bolt holding end 24 (FIGS. 6–8). A tapped hole 42 is provided internal to the bushing 40 to allow the cam shaped cutter 30 to be rotatably secured in the center cutter hole 34 of the tool shank with a mechanical fastener 44 as shown in FIG. 3. Preferably, the driver 38, cam shaped cutter 30, and bushing 40 are formed monolithically from a hardened tool steel that can withstand impact and wear. AISI 4140 hardened to 55 Rockwell C is a suitable material for the cam shaped cutter, driver and bushing. The cam shaped cutter 30 has a cutting surface with a peripheral cutting edge 46 between the driver 38 and the bushing 40 that passes over the bolt receiving bores 36 as the cam shaped cutter is rotated. The peripheral edge 46 of the cutter engages the bolt in the bolt receiving bore to shear the bolt to the desired length.

Figure 13:
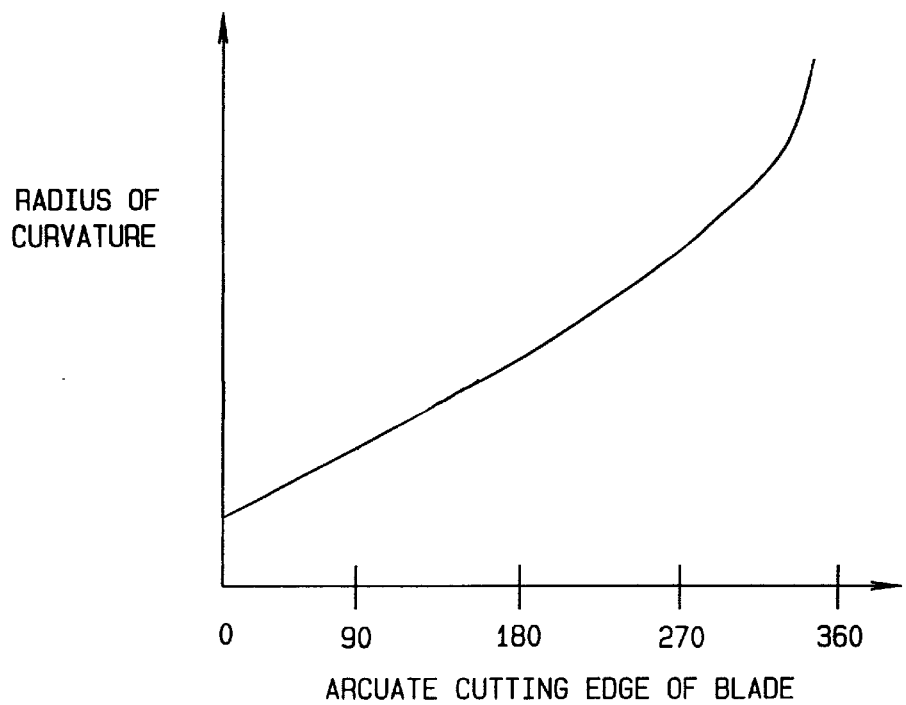
FIG. 13 is a graph illustrating how the radius of curvature of the arcuate peripheral cutting edge of the blade increases as the cutting edge extends from its cut initiating portion toward its cut finishing portion.

As shown in FIG. 5, the peripheral cutting edge 46 has the general form of a tear drop with a radius of curvature that increases from a cut initiating portion 50 of the cutter 30 to a cut finishing portion 52 of the cutter. To allow optimal positioning of the bolt relative to the cut initiating portion 50 of the cutter, a starting relief 54 is provided in the peripheral cutting edge 46 between the cut initiating portion 50 and the cut finishing portion 52. Moving in a counter-clockwise direction (as viewed in FIG. 5), the rate at which the radius of curvature of the cutting edge 46 increases is preferably substantially constant from the cut initiating portion 50 of the cutting edge 46 to a point 56, which is approximately 270 degrees (the 270° point) away from the start of the cut initiating portion 50. After the 270° point, the radius of curvature preferably increases at a rate greater than a constant rate. FIG. 13 is a graphical representation (not necessarily to scale) of the rate of increase of the radius of curvature of the cutting edge 46 of the cam shaped cutter 30. By increasing the radius gradually from the cut initiating portion to the 270° point, the speed of the cutter rotation relative to the bolt is kept relatively low and a large amount of torque can be generated to start the cut. By increasing the radius at a rate greater than a constant rate for the portion of the peripheral edge after the 270° point, the rate of movement of the cutting edge 46 through the bolt is increased, which ensures a cleaner cut with fewer burrs. Although a larger radius of curvature after the 270° point necessarily results in less torque, finishing the cut generally requires less torque than starting the cut. Thus, the radius of curvature can be dramatically increased, preferably after the 270° point, to accelerate the speed of the cut and prevent the formation of burrs on the end of the bolt. Preferably, the bolts are positioned in their bolt receiving bores at a distance from the cutter which enables the cut finishing portion 52 of the cutter 30 (after the 270° point) to pass through the bolt to complete the cut.

Figure 12:
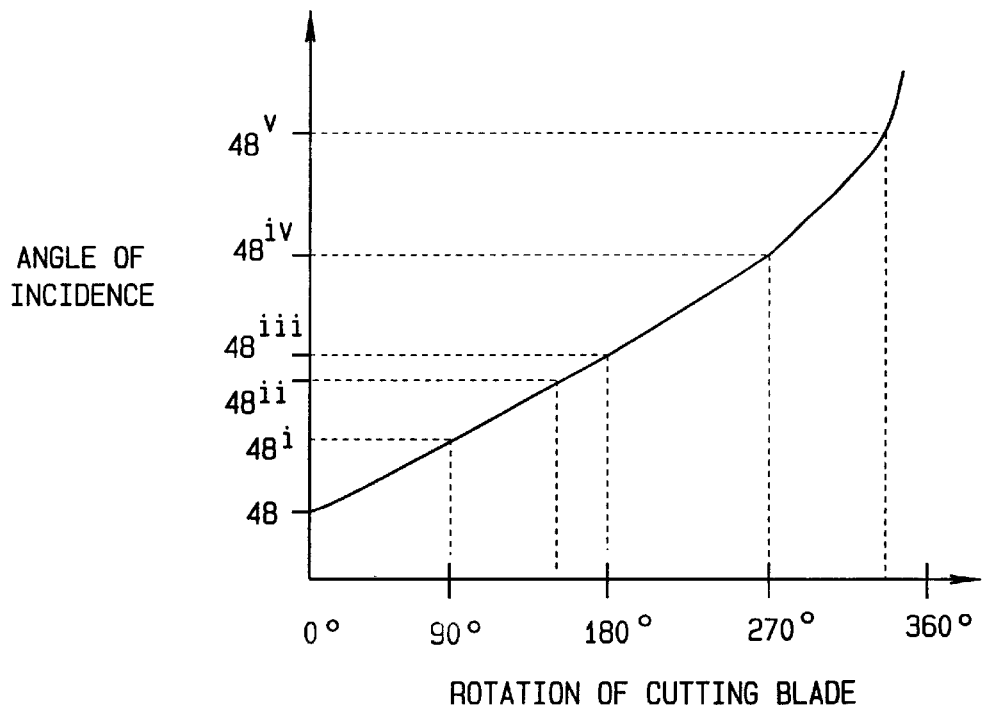
FIG. 12 is a graph illustrating how the angle of incidence between the cutting surface of the blade and the center axis of the bolt-receiving bore increases as the blade is rotated from its pre-cut starting position toward its post-cut finishing position.

To further enhance the efficiency of the cutter 30, the peripheral cutting edge 46 has an incident angle 48. Preferably, the incident angle 48 changes from the cut initiating portion 50 of the cutter 30 to the cut finishing portion 52. Referenced from an axis of rotation 58 of the cam shaped cutter, the incident angle 48 of the peripheral cutting edge at the cut initiating portion is preferably shallow, being no more than 10–15 degrees, to ensure the user can attain the proper amount of leverage and torque for starting a smooth, shearing cut. More preferably, the incident angle 48 is about 7 degrees at the start of the cut. As the radius of curvature of the cam cutter 30 increases, the incident angle 48 also preferably increases or flattens outs where less leverage and shearing force is needed to complete the cut that has already been started. The higher incident angle towards the cut finishing portion 52 of the cutter also ensures a clean finish with fewer burrs. Moving in a counterclockwise direction (as viewed in FIG. 5), the incident angle preferably increases at a substantially constant rate from the cut initiating portion 50 to about the 270° point, and after the 270° point, the rate of increase is preferably greater than a constant rate. FIGS. 6–8 provide further illustration of the increasing incident angles 48, $48^i$, $48^{ii}$, $48^{iii}$, $48^{iv}$, $48^v$ along the peripheral cutting edge 46. FIG. 12 provides a graphical representation of the rate of increase of the incident angle of the cam cutter, showing a greater than constant rate of increase for the incident angle after the 270° point. As stated previously, the bolts are preferably positioned in the bolt receiving bores at a distance from the cutter which enables the cut finishing portion of the cutter after the 270° point to pass through the bolt to cleanly and smoothly finish the cut.

Figure 9:
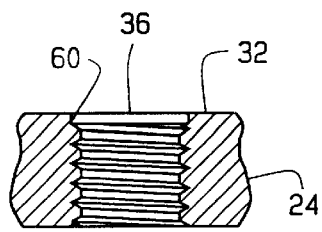
FIG. 9 is an enlarged cross-section view of one of the tapped holes taken along the plane of line 9—9 in FIG. 4.

With reference to FIG. 9, on the cutting side 32 of the tool shank, each of the bolt receiving bores 36 preferably has a counterbore 60 with a diameter approximately equal to the major diameter of the thread of the bolt and a depth equal to the spacing of at least one to three threads. With the counterbore 60 in the bolt receiving bore, the force and stress exerted by the threads of the bolt against the tool in the bolt receiving bore during cutting is borne by substantially the entire internally threaded portion of the bolt receiving bore, rather than by the rim at the surface of the bolt receiving bore. The counterbore 60 in effect relieves a stress concentration point on the tool shank, thereby preventing chipping of the tool shank adjacent the bolt receiving bore during cutting.

In operation, the bolt 62 to be sized is threaded into the applicable bolt receiving bore 36 such that the length desired to be removed extends from the bolt receiving bore on the cutting side 32 of the tool shank. The cam shaped cutter 30 may be rotated as necessary by hand to align the bolt in the starting relief 54. As shown in FIGS. 10–11, a box end wrench 64 or other suitable style wrench is engaged on the driver, and the cam shaped cutter 30 is rotated clockwise to move the starting relief 54 away from the bolt 62 and to force the peripheral cutting edge 46 into the bolt. To provide proper leverage, both the tool shank handle 26 and the driving wrench 64 are held on their respective distal ends with the bolt holding end 24 positioned away from the user. Preferably, the driver 38 extends axially away from the cutting side 32 of the tool shank a distance sufficient to ensure that the user's hand on the handle 26 remains clear of the driving wrench 64 when the driving wrench is rotated past the handle. Safety goggles should be used. Preferably, the driving wrench is rotated 360° to move the entire peripheral edge 46 of the cutter 30 through the bolt. By rotating the driving wrench, the cam shaped cutter 30 engages the bolt 62, shearing it to the desired custom length. After shearing the bolt, the bolt may be unscrewed from its threaded hole and used as desired.

Again, FIGS. 10 and 11 show the use of a box end wrench 64 or other suitable style wrench for rotating the driver 38 relative to the tool shank 22. However, alternatively, the hexagonally shaped driver 38 could be secured in a vice, and the tool shank 22 then rotated relative to the vice-secured driver 38 to accomplish the same cutting operation. For heavy-duty cutting jobs, this manner of use may actually be preferred.

Figure 14:
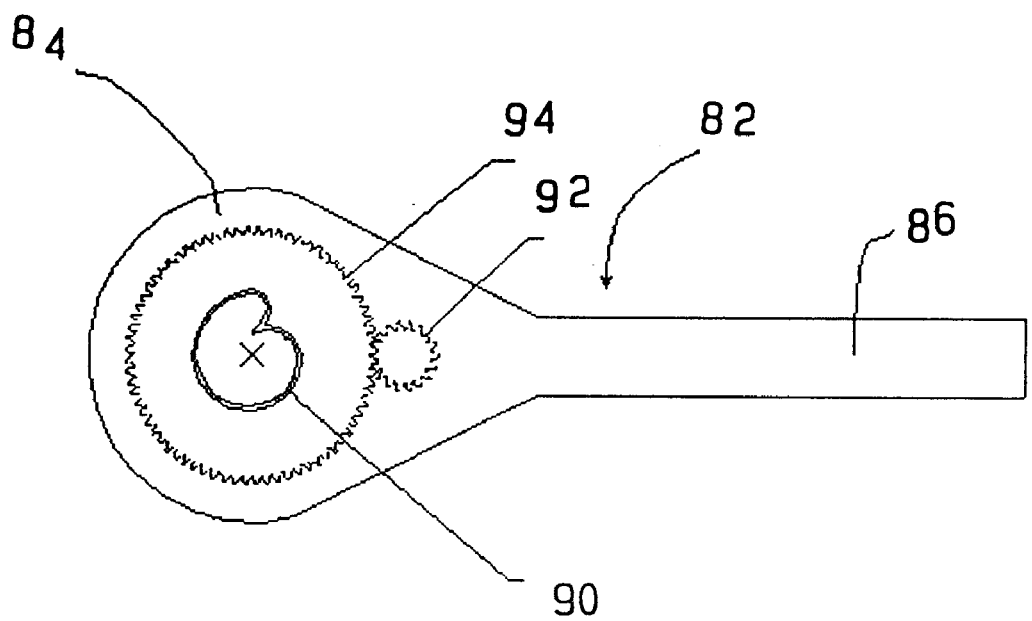
FIG. 14 is a front elevational view of an alternative embodiment of a bolt cutting tool of the present invention incorporating a gear driven mechanism for rotating a cutting blade.

FIG. 14 shows an alternative embodiment of the invention, which utilizes gear-driven multiplication to provide leverage, rather than relying on the length of the tool shank to provide the needed leverage. As shown in FIG. 14, a bolt cutting tool of this embodiment of the invention comprises a generally flat elongated tool shank 82 with a bolt holding end 84 and opposite handle 86. Preferably, the tool shank 82 is of sufficient length to enable the user to comfortably grip the tool, but the length of the shank is not as important in this embodiment because the necessary leverage is provided by a gear mechanism that creates a mechanical advantage, as described hereinafter.

The bolt holding end 84 is similar in most respects to the embodiment of FIGS. 1–4 and contains a plurality of bolt receiving bores (not shown). The bolt holding end 84 is provided with a cam shaped cutter 90, which is similar in virtually all respects to the cutter 30 described above. However, as shown in FIG. 14, the present embodiment of the invention further comprises a drive gear 92 and a driven gear 94. Preferably, the drive gear and the driven gear are each rotatably connected to the bolt holding end 84 of the tool generally adjacent one another and in operative engagement with one another so that rotational motion of the drive gear 92 is transmitted into rotational motion of the driven gear 94. Preferably, the drive gear 92 is configured for manual operation by a user. The drive gear 92 may include a hand-operable handle (not shown) for manual rotation of the drive gear 92 by a user or, alternatively, may include a hexagonally shaped driver (not shown), similar to the driver 38 described above, adapted for engagement by a box end wrench or other suitable style wrench for rotating the drive gear 92 relative to the tool shank 82. The driven gear 94 is preferably fixed relative to the cutter 90, and may be formed monolithically therewith. Thus, in operation of this embodiment of the tool, the user rotates the drive gear 92, which causes rotation of the driven gear 94, which in turn cases rotation of the cutter 90.

As shown in FIG. 14, the radius of the driven gear 94 is preferably larger than the radius of the drive gear 92, so that the two gears create a mechanical advantage through gear-driven multiplication, which provides leverage that assists the user in cutting a bolt with the tool. Preferably, the radius of the driven gear 94 is at least three times the radius of the drive gear 92.

While the present invention has been described by reference to specific embodiments and specific uses, it should be understood that other configurations could be constructed and other uses could be made without departing from the scope of the invention as set forth in the following claims.

What is claimed is:

1. A bolt cutting tool comprising:
   a bolt engaging portion having at least one bolt-receiving bore adapted for receiving a portion of a bolt to be cut; and
   a cutting blade rotatably connected to the tool generally adjacent the bolt engaging portion, the cutting blade having a cutting surface with an arcuate peripheral cutting edge, the cutting blade being adapted for rotation relative to the bolt-receiving bore from a pre-cut starting position toward a post-cut finishing position in a manner so that the arcuate peripheral cutting edge of the blade cuts the bolt as the cutting blade is rotated toward the post-cut finishing position;
   wherein an angle of incidence between the cutting surface of the blade and a center axis of the bolt-receiving bore is less than 15 degrees when the blade is in its pre-cut starting position.

2. The bolt cutting tool of claim 1 wherein the angle of incidence between the cutting surface of the blade and the center axis of the bolt-receiving bore is less than 10 degrees when the blade is in its pre-cut starting position.

3. The bolt cutting tool of claim 2 wherein the angle of incidence between the cutting surface of the blade and the center axis of the bolt-receiving bore is no more than 7 degrees when the blade is in its pre-cut starting position.

4. The bolt cutting tool of claim 1 wherein the cutting blade is connected to the tool for rotating movement in a plane that is generally perpendicular to the center axis of the bolt-receiving bore.

5. The bolt cutting tool of claim 1 wherein the angle of incidence between the cutting surface of the blade and the center axis of the bolt-receiving bore is smaller when the blade is in its pre-cut starting position than it is when the blade is in its post-cut finishing position.

6. The bolt cutting tool of claim 5 wherein the angle of incidence between the cutting surface of the blade and the center axis of the bolt-receiving bore increases as the blade is rotated from its pre-cut starting position toward its post-cut finishing position.

7. The bolt cutting tool of claim 6 wherein the angle of incidence between the cutting surface of the blade and the center axis of the bolt-receiving bore increases at a rate that is greater than a constant rate of increase as the blade is rotated from its pre-cut starting position toward its post-cut finishing position.

8. The bolt cutting tool of claim 1 wherein the arcuate peripheral cutting edge has a cut initiating portion adapted for initial engagement with a bolt received in the bolt-receiving bore when the cutting blade is in its pre-cut starting position and a cut finishing portion adapted for engagement with the bolt when the cutting blade is rotated toward its post-cut finishing position, the arcuate peripheral cutting edge having a radius of curvature that increases as the cutting edge extends from its cut initiating portion toward its cut finishing portion.

9. The bolt cutting tool of claim 8 wherein the radius of curvature of at least a portion of the arcuate peripheral cutting edge increases at a rate that is greater than a constant rate as the cutting edge extends toward its cut finishing portion.

10. The bolt cutting tool of claim 1 wherein said at least one bolt-receiving bore has an internally threaded portion adapted for threaded engagement with an externally threaded bolt, the internally threaded portion of said at least one bolt-receiving bore defining a major inside diameter of the bore and a minor inside diameter of the bore, the major inside diameter being larger than the minor inside diameter.

11. The bolt cutting tool of claim 10 wherein the arcuate peripheral cutting edge of the cutting blade lies within a plane that is perpendicular to an axis of rotation of the cutting blade, and wherein an end portion of said at least one bolt-receiving bore adjacent to said plane is counterbored to a diameter at least as large as said major inside diameter.

12. The bolt cutting tool of claim 1 comprising a plurality of bolt-receiving bores with a variety of different inside diameters.

13. The bolt cutting tool of claim 1 further comprising a drive gear with a first radius and a driven gear with a second radius larger than the first radius, the drive gear and driven gear each being rotatably connected to the tool generally adjacent one another, the drive gear and driven gear being in operative engagement with one another in a manner so that rotational motion of the drive gear is transmitted into rotational motion of the driven gear, the driven gear being fixed relative to the cutting blade, whereby rotation of the drive gear by a user causes rotation of the cutting blade via the driven gear.

14. A bolt cutting tool comprising:
   a bolt engaging portion having at least one bolt-receiving bore adapted for receiving a portion of a bolt to be cut; and
   a cutting blade connected to the tool generally adjacent the bolt engaging portion, the cutting blade having a cutting surface with an arcuate peripheral cutting edge, the cutting blade being adapted for rotation relative to the bolt-receiving bore from a pre-cut starting position toward a post-cut finishing position in a manner so that the arcuate peripheral cutting edge of the blade cuts the bolt as the cutting blade is rotated, the arcuate peripheral cutting edge having a cut initiating portion adapted for initial engagement with a bolt received in the bolt-receiving bore when the cutting blade is in its pre-cut starting position and a cut finishing portion adapted for engagement with the bolt when the cutting blade is rotated toward its post-cut finishing position, the arcuate peripheral cutting edge having a radius of curvature that increases as the cutting edge extends from its cut initiating portion toward its cut finishing portion;
   wherein the radius of curvature of at least a portion of the arcuate peripheral cutting edge increases at a rate that is greater than a constant rate as the cutting edge extends toward its cut finishing portion.

15. The bolt cutting tool of claim 14 wherein the portion of the arcuate peripheral cutting edge that increases at a rate that is greater than a constant rate as the cutting edge extends from its cut initiating portion toward its cut finishing portion is coincident with the cut finishing portion of the arcuate peripheral cutting edge.

16. The bolt cutting tool of claim 14 wherein an angle of incidence between the cutting surface of the blade and a center axis of the bolt-receiving bore is less than 15 degrees when the blade is in its pre-cut starting position.

17. The bolt cutting tool of claim 16 wherein the angle of incidence between the cutting surface of the blade and the center axis of the bolt-receiving bore is less than 10 degrees when the blade is in its pre-cut starting position.

18. The bolt cutting tool of claim 17 wherein the angle of incidence between the cutting surface of the blade and the center axis of the bolt-receiving bore is no more than 7 degrees when the blade is in its pre-cut starting position.

19. The bolt cutting tool of claim 16 wherein the angle of incidence between the cutting surface of the blade and the center axis of the bolt-receiving bore is smaller when the blade is in its pre-cut starting position than it is when the blade is in its post-cut finishing position.

20. The bolt cutting tool of claim 19 wherein the angle of incidence between the cutting surface of the blade and the center axis of the bolt-receiving bore increases as the blade is rotated from its pre-cut starting position toward its post-cut finishing position.

21. The bolt cutting tool of claim 20 wherein the angle of incidence between the cutting surface of the blade and the center axis of the bolt-receiving bore increases at a rate that is greater than a constant rate of increase as the blade is rotated from its pre-cut starting position toward its post-cut finishing position.

22. The bolt cutting tool of claim 14 wherein said at least one bolt-receiving bore has an internally threaded portion adapted for threaded engagement with an externally threaded bolt, the internally threaded portion of said at least one bolt-receiving bore defining a major inside diameter of the bore and a minor inside diameter of the bore, the major inside diameter being larger than the minor inside diameter.

23. The bolt cutting tool of claim 22 wherein the arcuate peripheral cutting edge of the cutting blade lies within a plane that is perpendicular to an axis of rotation of the cutting blade, and wherein an end portion of said at least one bolt-receiving bore adjacent to said plane is counterbored to a diameter at least as large as said major inside diameter.

24. The bolt cutting tool of claim 14 comprising a plurality of bolt-receiving bores with a variety of different inside diameters.

25. The bolt cutting tool of claim 14 further comprising a drive gear with a first radius and a driven gear with a second radius larger than the first radius, the drive gear and driven gear each being rotatably connected to the tool generally adjacent one another, the drive gear and driven gear being in operative engagement with one another in a manner so that rotational motion of the drive gear is transmitted into rotational motion of the driven gear, the driven gear being fixed relative to the cutting blade, whereby rotation of the drive gear by a user causes rotation of the cutting blade via the driven gear.

26. A bolt cutting tool comprising:
   a bolt engaging portion having at least one bolt-receiving bore with an internally threaded portion adapted for threaded engagement with an externally threaded bolt to be cut, the internally threaded portion of said at least one bolt-receiving bore defining a major inside diameter of the bore and a minor inside diameter of the bore, the major inside diameter being larger than the minor inside diameter;
   a cutting blade rotatably connected to the tool generally adjacent the bolt engaging portion, the cutting blade having a cutting surface with an arcuate peripheral cutting edge, the cutting blade being adapted for rotation relative to the bolt-receiving bore from a pre-cut starting position toward a post-cut finishing position in a manner so that the arcuate peripheral cutting edge of the blade cuts the bolt as the cutting blade is rotated toward the post-cut finishing position, the arcuate peripheral cutting edge lying within a plane that is generally perpendicular to an axis of rotation of the cutting blade; and
   wherein an end portion of said at least one bolt-receiving bore adjacent to said plane is counterbored to a diameter larger than said minor inside diameter.

27. The bolt cutting tool of claim 26 wherein the end portion of said at least one bolt-receiving bore is counterbored to a diameter at least as large as said major inside diameter.

28. The bolt cutting tool of claim 26 wherein the cutting blade wherein an angle of incidence between the cutting surface of the blade and a center axis of the bolt-receiving bore is no more than 15 degrees when the blade is in its pre-cut starting position.

29. The bolt cutting tool of claim 26 wherein the arcuate peripheral cutting edge has a cut initiating portion adapted for initial engagement with a bolt received in the bolt-receiving bore when the cutting blade is in its pre-cut starting position and a cut finishing portion adapted for engagement with the bolt when the cutting blade is rotated toward its post-cut finishing position, the arcuate peripheral cutting edge having a radius of curvature that increases as the cutting edge extends from its cut initiating portion toward its cut finishing portion, wherein the radius of curvature of at least a portion of the arcuate peripheral cutting edge increases at a rate that is greater than a constant rate as the cutting edge extends toward its cut finishing portion.

\* \* \* \* \*